United States Patent [19]

Ahn

[11] Patent Number: 5,671,071

[45] Date of Patent: Sep. 23, 1997

[54] DRIVE DEVICE FOR PAPER FEEDER

[75] Inventor: Hey-Song Ahn, Seoul, Rep. of Korea

[73] Assignee: Hyundai Electronics Industrial Co., Ltd., Kyoungki-do, Rep. of Korea

[21] Appl. No.: 365,700

[22] Filed: Dec. 29, 1994

[30] Foreign Application Priority Data

Dec. 30, 1993 [KR] Rep. of Korea ............... 31573/1993

[51] Int. Cl.$^6$ ............... H04N 1/04; H04N 1/36
[52] U.S. Cl. ............... 358/498; 358/412; 358/414
[58] Field of Search ............... 358/498, 496, 358/400, 401, 500, 501, 409, 412, 414; 271/10.03, 10.04, 10.11, 10.13, 242, 225, 258.01; 355/308

[56] References Cited

U.S. PATENT DOCUMENTS

| | | | |
|---|---|---|---|
| 3,961,786 | 6/1976 | Yanker | 271/122 |
| 4,003,512 | 1/1977 | Mori | 226/188 |
| 4,721,297 | 1/1988 | Katayama | 271/10 |
| 4,722,518 | 2/1988 | Watanabe | 271/9 |
| 5,393,044 | 2/1995 | Hagihara et al. | 271/10 |
| 5,395,102 | 3/1995 | Eguchi | 271/10 |
| 5,462,267 | 10/1995 | Hori | 271/10.04 |
| 5,523,858 | 6/1996 | Yamada et al. | 358/400 |

*Primary Examiner*—Edward L. Coles, Sr.
*Assistant Examiner*—Fan Lee
*Attorney, Agent, or Firm*—Morgan & Finnegan, L.L.P.

[57] ABSTRACT

A jam preventing drive device for a facsimile suitable for removing instability of document relay and for preventing document jam. The drive device has a drive motor, main transmission gears for rotating both a document separation roller and a guide roller during initial rotation of the motor, and for rotating a register roller during reverse rotation of the motor. Auxiliary transmission mechanism transmit the rotating force of the register roller to the document separation roller during the reverse rotation of the motor. In the drive device, the rotating force of the motor is transmitted to both the document separation roller and the guide roller during the initial rotation of the motor, while the rotating force of the motor is transmitted to both the register roller and the document separation roller during the reverse rotation of the motor.

20 Claims, 8 Drawing Sheets

DRIVE DEVICE FOR PAPER FEEDER

BACKGROUND OF THE INVENTION

1. Field of the Invention

The present invention relates in general to a drive device for a facsimile and, more particularly, to a structural improvement in such a drive device for preventing a possible jam of a facsimile document during document feeding operation.

2. Description of the Prior Art

In document feeding operation of a typical drive device for a facsimile, both a guide roller and a document separation roller are rotated by forward rotating force of a drive motor, to feed the document to be sent. When the document has reached the center line of a register roller, the drive motor is rotated in reverse direction so that the reverse rotating force of the drive motor is transmitted to rotate both the register roller and an out feeding roller. When the rotating direction of the drive motor is changed from the forward direction to the reverse direction, there is generated instantaneous relay of the document. Such instantaneous relay of the document caused by the rotating directional change of the drive motor makes document feeding operation unstable and may cause misfeeding, such as jamming of a document, of the drive device.

With reference to FIG. 1A, there is shown a document feed mechanism of a typical drive device for a facsimile.

The drive device of the facsimile includes a lower structure and an upper structure. In the lower structure of the drive device, a plurality of rollers. (that is, a guide roller 108, a document separation roller 109, a register roller 110 and an out feeding roller 111.) are held by a pair of parallel frames 101 and 102. The rollers 108 to 111 are orderly arranged in the document feed direction or in a leftward direction of FIG. 1A. In order to supply a rotating force for all the rollers 108 to 111, a drive motor 112 is interiorly mounted to the first frame 101. In the drive device, the rotating force of the drive motor 112 is transmitted to either the document separation roller 109 or the register roller 110. In order to achieve the above object, a plurality of transmission gears 113, 114, 115, 116, 118 and 120 are exteriorly provided on the first frame 101, which gears are contained in a gear box 103. The document separation roller 109 and the guide roller 108 have belt pulleys 124 and 126, which belt pulleys 124 and 126 in turn are connected to and cooperate with each other through a first timing belt 125. Therefore, the rotating force of the document separation roller 109 can be transmitted to the guide roller 108. In the same manner, the register roller 110 and the out feeding roller 111 cooperate with each other through their belt pulleys 121 and 123 and a second timing belt 122, so that the rotating force of the register roller 110 can be transmitted to the out feeding roller 111.

The upper structure of the drive device is set on the above lower structure. The upper structure includes a press 104, a pair of springs 106 and 107 and a bracket 105. The upper structure also includes a pair of rollers 127 and 128, which rollers 127 and 128 are rotated by rotating force transmitted thereto from the register roller 110.

In operation of the above drive device, the drive motor 112 is primarily rotated in forward direction or in clockwise direction. The forward rotating force of the drive motor 112 is transmitted to the document separation roller 109 through a first one way clutch 117. The rotating force of the document separation roller 109 in turn is transmitted to the guide roller 108 through the belt pulleys 124 and 126 connected to each other by means of the timing belt 125.

That is, the forward rotating force of the drive motor 112 is exclusively applied to the document separation roller 109 and to the guide roller 108, thus to exclusively rotate those rollers 109 and 108. Therefore, the guide roller 108 as well as the document separation roller 109 feeds a facsimile document to the center line of the register roller 110. When the facsimile document has reached the center line of the register roller 110, the drive motor 112 changes its rotating direction into reverse direction or counterclockwise direction. The reverse rotating force of the drive motor 112 is transmitted to the register roller 110 through a second one way clutch 119 and in turn transmitted to the out feeding roller 111 through the belt pulleys 122 and 123 and through the second timing belt 122. Therefore, the register roller 110 as well as the out feeding roller 111 is rotated, while neither the document separation roller 109 nor the guide roller 108 is applied with the rotating force of the drive motor 112. Hence, the register roller 110 and the out feeding roller 111 are exclusively engaged in the document feeding motion.

However, the above drive device of facsimile has the following problem. When the document has reached the center line of the register roller 110, the drive motor changes its rotating direction into the reverse direction and, at this time, there is generated instantaneous relay of the document. Such instantaneous relay of document caused by rotating directional change of the drive motor makes the feed of document unstable and may cause document jam and document misfeeding.

Referring to FIG. 1B (showing a document feeding process by sections and document jam sensing positions of the typical drive device), when the document is jammed in either section I, II or III, a first sensor 150 senses the jammed document. Meanwhile, when the facsimile document is jammed in either section IV, V or VI, a second sensor 151 senses the jammed document. The document jam will cause misfeeding of document and causes the image sensor to fail in reading the document at a document sensing line 104.

SUMMARY OF THE INVENTION

It is, therefore, an object of the present invention to provide a jam preventing drive device for a facsimile in which the above problems can be overcome and which removes instability of document relay generated during document feeding operation, thus to improve operational reliability of the facsimile, and particularly prevents possible twisting of documents as well as possible misfeeding of documents during the document feeding operation, thus to prevent document jam.

In order to accomplish the above object, a jam preventing drive device for a facsimile in accordance with the present invention comprises a drive motor for generating rotating force. The jam preventing drive device also includes main transmission gears for rotating both a document separation roller and a guide roller by transmitting the rotating force of the motor to the rollers during initial rotation of the motor, and for rotating a register roller by transmitting the rotating force of the motor to the register roller during reverse rotation of the motor. The register roller, the document separation roller and the guide roller, are connected to the main transmission gears, and auxiliary transmission means is provided for transmitting the rotating force of the register roller to the document separation roller during the reverse rotation of the motor, whereby the rotating force of the motor is transmitted to both the document separation roller and the guide roller during the initial rotation of the motor, while the rotating force of the motor is transmitted to both the register roller and the document separation roller during the reverse rotation of the motor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
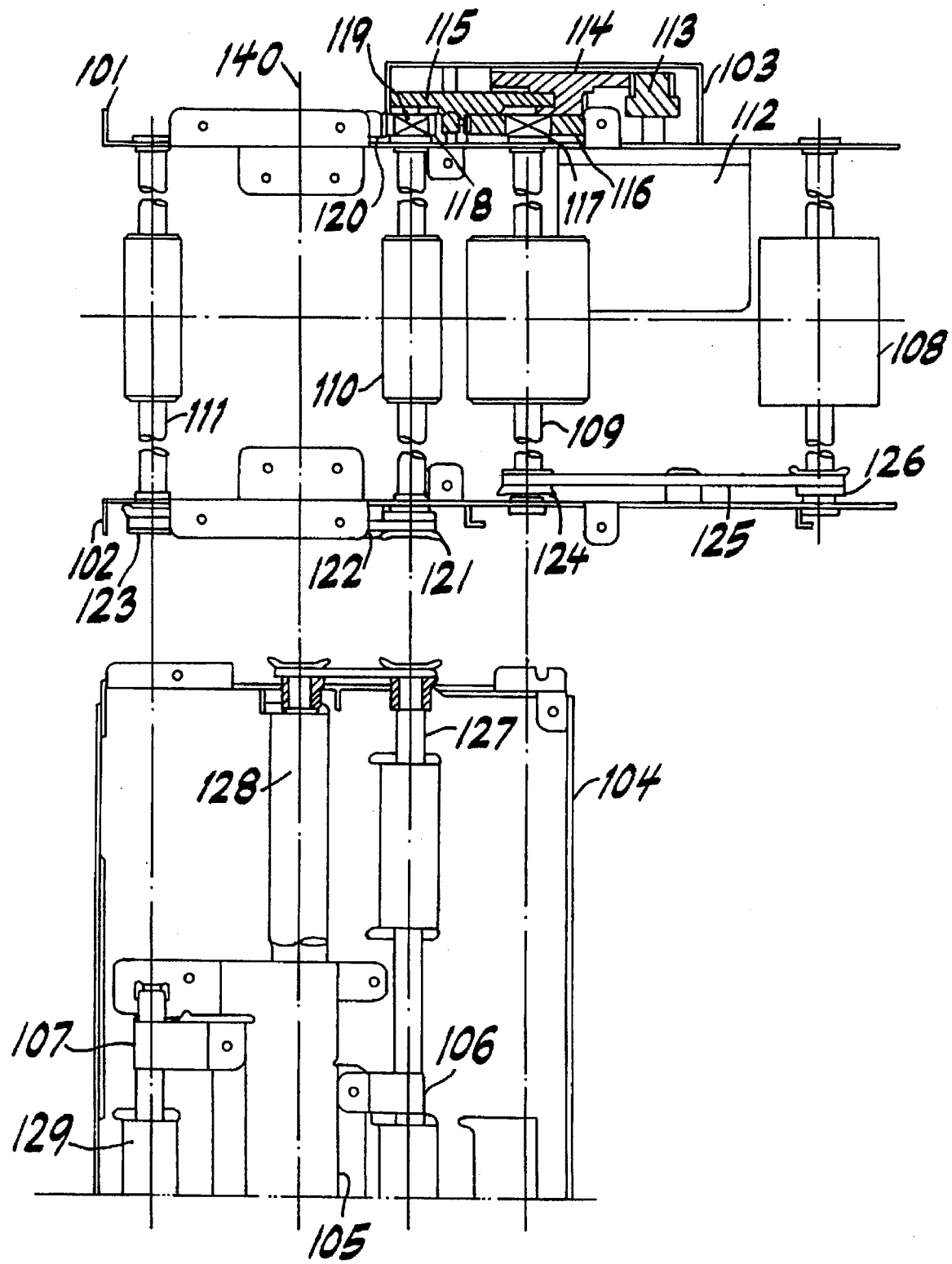
FIG. 1A is a view of a typical drive device for a facsimile, showing a document feed mechanism of the drive device.
Figure 1B:
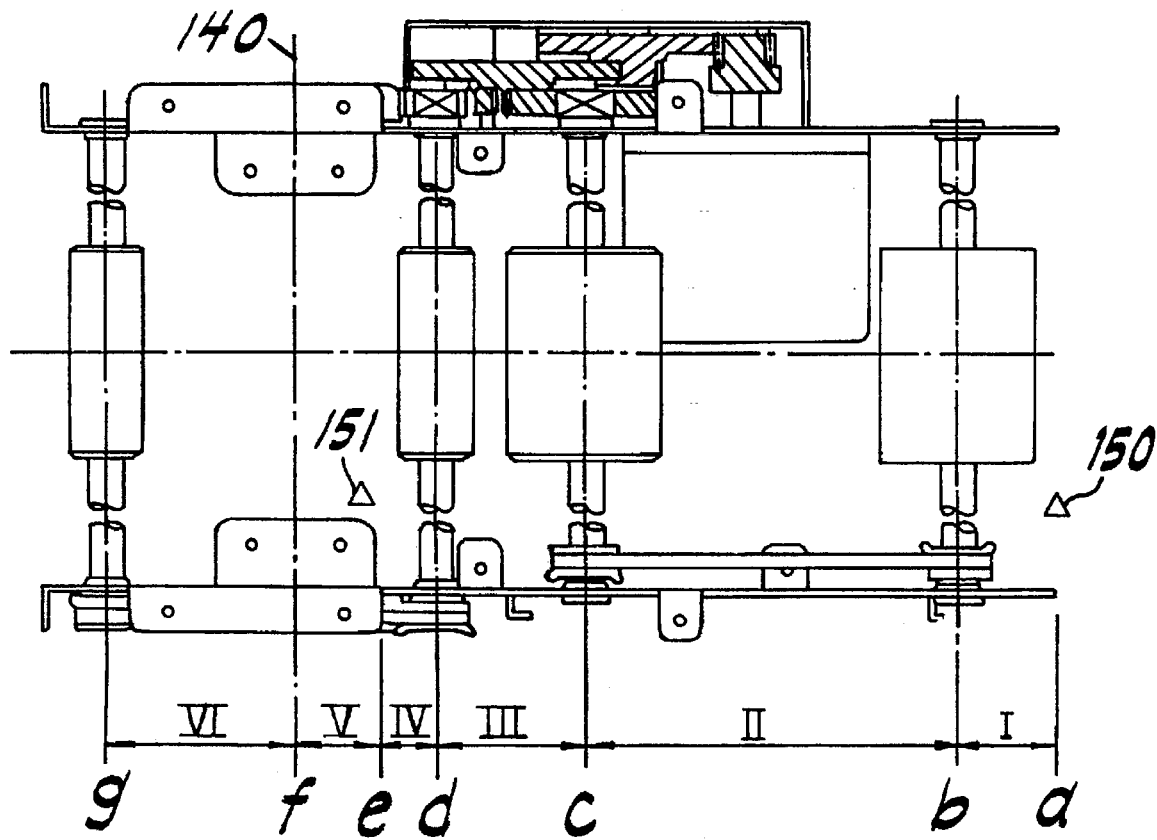
FIG. 1B is a view of the drive device of FIG. 1A, representing a document feeding process by sections and document jam sensing positions of the drive device.
Figure 2A:
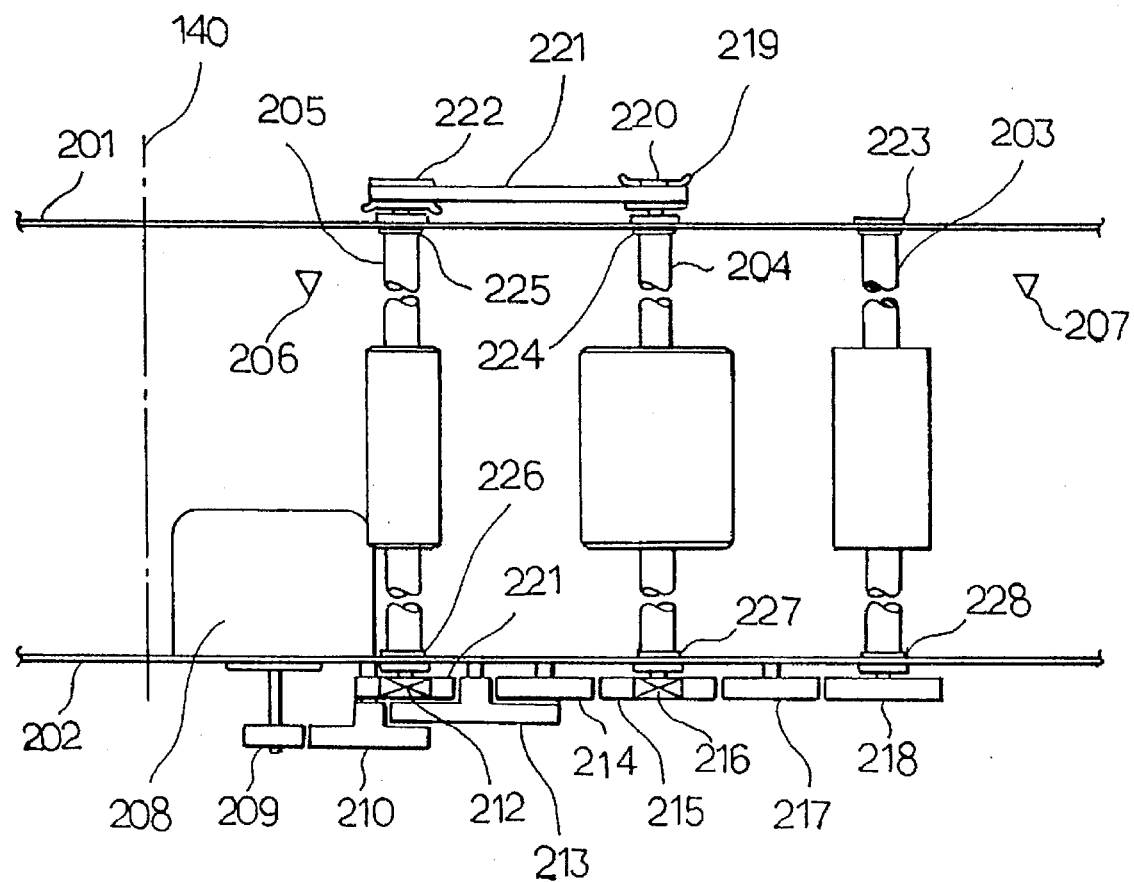
FIG. 2A is a view showing a jam preventing drive device for a facsimile in accordance with a primary embodiment of the present invention, representing operational theory of the drive device.

With reference to FIG. 2A, there is shown a jam preventing drive device for a facsimile according to a primary embodiment of the present invention. In the jam preventing drive device, a pair of spaced frames 201 and 202 are arranged so as to be parallel to each other. A plurality of rollers. (a guide roller 203, a document separation roller 204 and a register roller 205). are held between the two frames 201 and 202. The drive device also includes a drive motor 208 that is interiorly mounted to the second frame 202. In order to transmit the rotating force of an output gear 209 of the motor 208, a plurality of main transmission gears 210, 211, 213, 214, 215, 217 and 218 and a pair of one way clutches 212 and 216 are exteriorly provided on the second frame 202. Inside of the first frame 201, the drive device also includes an auxiliary belt transmission system for transmitting the rotating force from the register roller 205 to the document separation roller 204. That is, the document separation roller 204 and the register roller 205 have mounted at their ends belt pulleys 219 and 222 respectively, which belt pulleys 219 and 222 in turn are connected to and cooperate with each other through a timing belt 221. In addition, the pulley 219 of the document separation roller 204 is provided with a third one way clutch 220.

In order to send a document using the facsimile having the above drive device, the document is set on the drive device, so that a first document sensor 207 senses the document and causes the drive motor 208 be rotated in forward direction or in clockwise direction. The rotating force of the motor 208 is outputted from the motor output gear 209. The rotating force of the motor 208 is transmitted from the output gear 209 to a pair of transmission step gears 210 and 213 and to the other transmission gears 214,215,217 and 218 in that order. In this case, the rotating force transmission between the gears 215 and 217 is achieved by the action of the second one way clutch 216. Therefore, the rotating force of the motor 208 is transmitted to the document separation roller 204 as well as to the guide roller 203. Here, the guide roller 203 is rotatably supported by the frames 201 and 202 by means of a pair of bushings 223 and 228, while the document separation roller 204 is rotatably supported by the frames 201 and 202 by means of a pair of bushings 224 and 227. As the guide roller 203 and the document separation roller 204 are rotated by the rotating force of the motor 208, the document set on the drive device starts to be fed. At this time, the guide roller 203 as well as the document separation roller 204 is applied with and rotated by the rotating force of the motor 208, while the register roller 205 is not applied with rotating force of the motor 208 by the action of the first one way clutch 212.

In the present invention, it is possible to collectively process the document from the initial document feeding step just after sensing the set document by the document sensor 207 to the document reading step at the document sensing line 140. However, such a process may cause problems in the feeding of a document as well as in counting of documents, so that the process can not be profitably adapted. That is, the process may not only cause a problem of twisting of the document during the document feeding step but also cause a problem in counting documents when feeding a plurality of documents one after another, which documents are set on the drive device at once.

In this regard, it is more profitable to neatly arrange the front end of the document after the front end of the document has passed the center line of the register roller 205 by rotation of both the guide roller 203 and the document separation roller 204.

After neatly arranging the front end of the document, the rotating direction of the drive motor 208 is changed into the reverse direction or into the counterclockwise direction. The rotating force of the motor 208 is transmitted to the register roller 205, which roller 205 is rotatably supported by the frames 201 and 202 through a pair of bushings 225 and 226. In this case, the rotating force of the motor 208 is transmitted to the register roller 205 through the output gear 209, the transmission gears 210 and 211 and the first one way clutch 212. At this time, neither the document separation roller 204 nor the guide roller 203 is directly applied with the rotating force of the motor 208 by the action of the second one way clutch 216.

However, the rotating force of the register roller 205 in turn is transmitted to the document separation roller 204 through the pulleys 222 and 219, the belt 221 and the third one way clutch 220, thus to rotate the document separation roller 204.

As a result of rotation of both the document separation roller 204 and the register roller 205, the document whose front end has been neatly arranged after passing the center line of the register roller 205 is continuously fed.

While the document is fed past the register roller 205, a second document sensor 206 senses the front end of the document. When the document has reached the document sensing line 140, an image sensor (not shown) reads the document. The document, after being read, is discharged from the facsimile by the action of an out feeding roller (not shown).

During the above document feeding operation of the drive device, there will be no problem when only one document needs to be sent. However, when a plurality of documents need to be sent one after another, it is required to provide a predetermined gap between sensing time of the rear end of the document by the second document sensor 206 and starting time of a next document to be fed.

However, it is noted that provision of such a gap for the document feeding operation of the drive device is difficult since the next document separated by the document separation roller 204 intends to start to be fed just after the second document sensor 206 senses the rear end of the previous document.

Figure 2B:
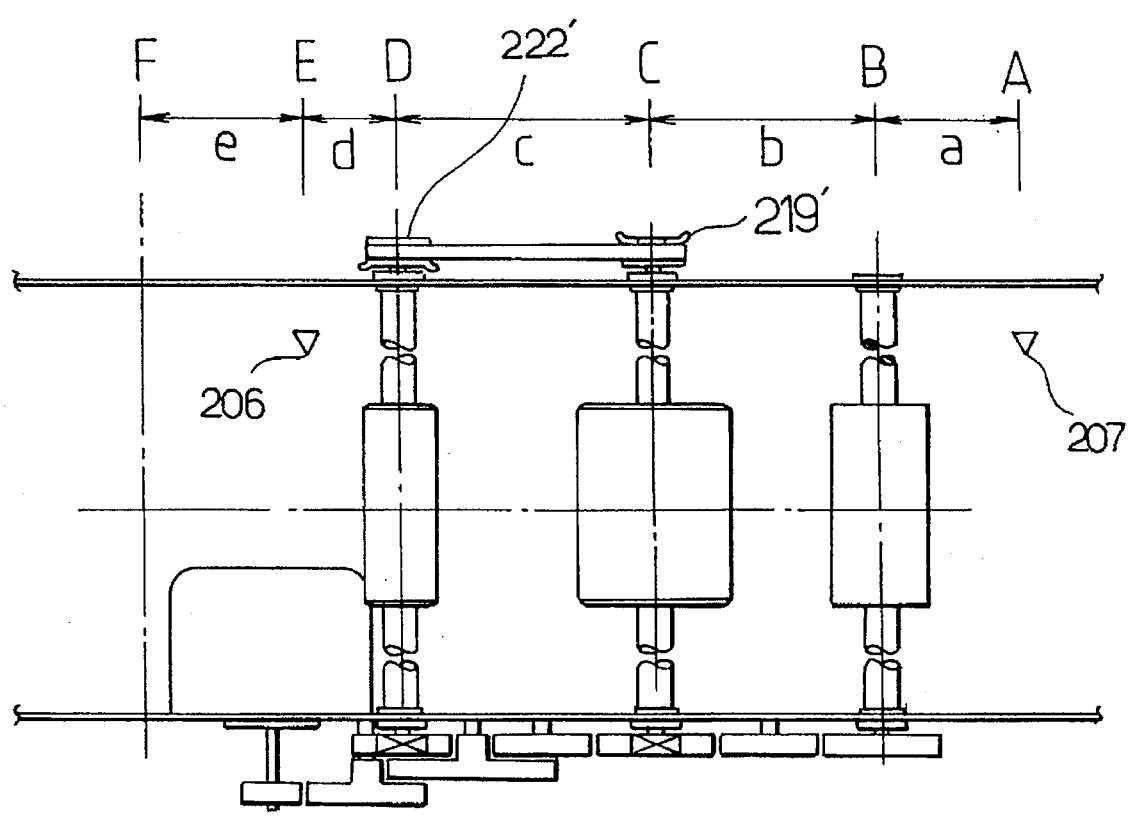
FIG. 2B is a view of the drive device of FIG. 2A, representing a document feeding process by sections of the drive device.

In order to successfully provide such a gap for document feeding operation of the drive device, overcoming the above-described difficulty, the invention provides the register roller 205 with a surface linear velocity at least two times greater than that of the document separation roller 204 as shown in FIG. 2B. To make the surface linear velocity of the roller 205 higher than that of the roller 204, the diameter of the pulley 222' of the roller 205 is larger than that of the pulley 219' of the roller 204. When the initial document starts from the line C, the initial document is fed at higher linear velocity due to the register roller 205 having the higher linear velocity, while the next document is fed at a lower linear velocity due to the document separation roller 205 having the lower linear velocity. At this time, the linear velocity of the initial document is at least two times higher than that of the next document. Therefore, when the next document starting from the line C reaches midway between lines C and D, the initial document has passed by the line D, so that the second sensor 206 on the line D has sensed the rear end of the initial document. Therefore, there is formed the desired gap between the initial document and the next document in the drive device.

Figure 3:
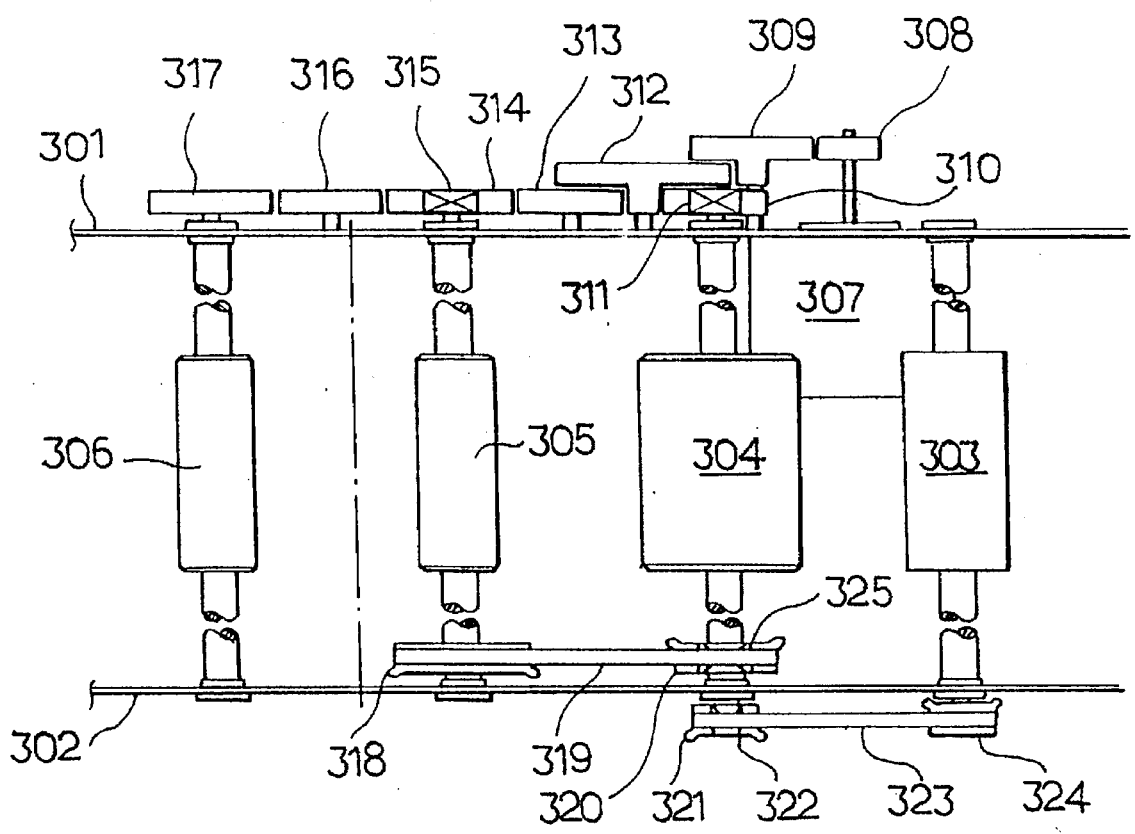
FIG. 3 is a view showing a jam preventing drive device for a facsimile in accordance with a second embodiment of the present invention.

Turning to FIG. 3, there is shown a jam preventing drive device for a facsimile in accordance with a second embodiment of the present invention. In the second embodiment, a guide roller 303, a document separation roller 304, a register roller 305 and an out feeding roller 306 are held by a pair of spaced frames 301 and 302. In addition, a drive motor 307 is interiorly mounted to the first frame 301 in the same manner as described for the primary embodiment shown in FIG. 2A. In order to transmit the rotating force of the motor 307 to either the document separation roller 304 or the register roller 305, a plurality of main transmission gears 308, 309, 310, 312, 313, 314, 316 and 317 and a pair of one way clutches 311 and 315 are exteriorly provided on the first frame 301. Inside of the second frame 302, the drive device also includes a first auxiliary belt transmission system for transmitting the rotating force from the register roller 305 to the document separation roller 304 and a second belt transmission system for transmitting the rotating force from the separation roller 304 to the guide roller 303. That is, the document separation roller 304 and the register roller 305 have mounted thereon belt pulleys 320 and 318, respectively which belt pulleys 318 and 320 in turn are connected to and cooperate with each other through a first timing belt 319. In addition, the first pulley 320 of the document separation roller 304 is provided with a third one way clutch 325. In order to transmit the rotating force of the document separation roller 304 to the guide roller 303, the rollers 303 and 304 have mounted thereon belt pulleys 324 and 321, respectively which belt pulleys 321 and 324 in turn are connected to and cooperate with each other through a second timing belt 323. In addition, the second pulley 321 of the document separation roller 304 is provided with a fourth one way clutch 322.

In operation of the drive device of the second embodiment, the initial rotating force of the drive motor 307 is transmitted to the document separation roller 304 through the motor output gear 308, the transmission gears 309 and 310 and the first one way clutch 311, thus to rotate the document separation roller 304. The rotating force of the document separation roller 304 in turn is transmitted to the guide roller 303 by the action of the fourth one way clutch 322. Therefore, the document separation roller 304 as well as the guide roller 303 are rotated. After the front end of the document has passed by the register roller 305 and has been neatly arranged, the rotating direction of the drive motor 307 is reversed. The rotating force of the motor 307 is transmitted to the register roller 305 through the gears 308, 309, 312, 313 and 314 and the second one way clutch 315, and also transmitted to the out feeding roller 306 through the transmission gears 314, 316 and 317.

The rotating force of the register roller 305 in turn is transmitted to the document separating roller 304 through the pulleys 318 and 320 and through the third one way clutch 325. At this time, the rotating force of the document separation roller 304 is not transmitted to the guide roller 303 by the action of the fourth one way clutch 322.

Therefore, the document whose front end has been arranged trimly after passing the center line of the register roller 305 is continuously fed by the rotation of both the document separation roller 304 and the register roller 305.

Figure 4:
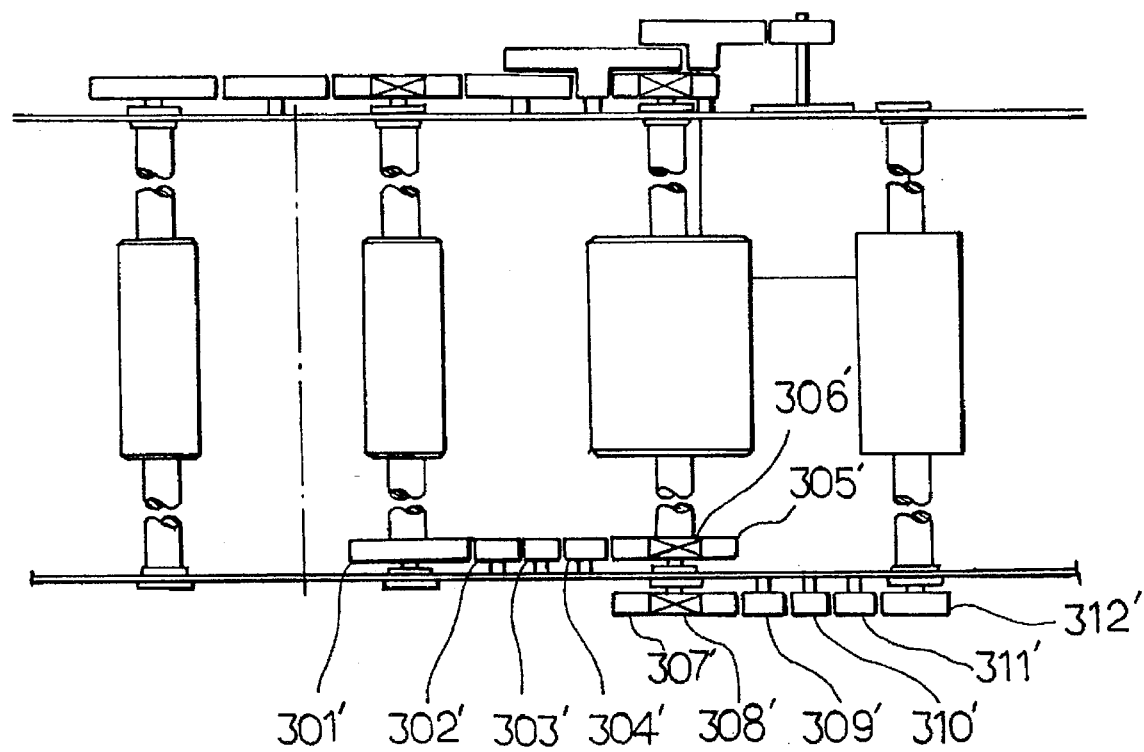
FIG. 4 is a view showing a jam preventing drive device for a facsimile in accordance with a third embodiment of the present invention.

Turning to FIG. 4, there is shown a jam preventing drive device for a facsimile in accordance with a third embodiment of the present invention. In the third embodiment, the general shape of the drive device remains the same as in the second embodiment, but the auxiliary belt transmission systems for transmitting the rotating force between rollers are substituted with gear transmission systems, each of which gear transmission systems has a plurality of middle gears and an idle gear.

That is, the rotating shaft of the register roller is provided with a gear 301', while the rotating shaft of the document separation roller is provided with a first idle gear 305' having a first one way clutch 306' therein. The two gears 301' and 305' are connected to and cooperate with each other through a plurality of middle gears 302', 303' and 304'.

The rotating shaft of the document separation roller is also provided with a second idle gear 307' having a second one way clutch 308', while the rotating shaft of the guide roller is provided with a gear 312'. The two gears 307' and 312' are connected to and cooperate with each other through a plurality of middle gears 309', 310' and 311'. The operation of the drive device of the third embodiment is similar to that of the drive device of the second embodiment and further explanation is thus not deemed necessary.

The drive device of the third embodiment yields the same result as that described for the second embodiment without affecting the functioning of this invention.

Figure 5:
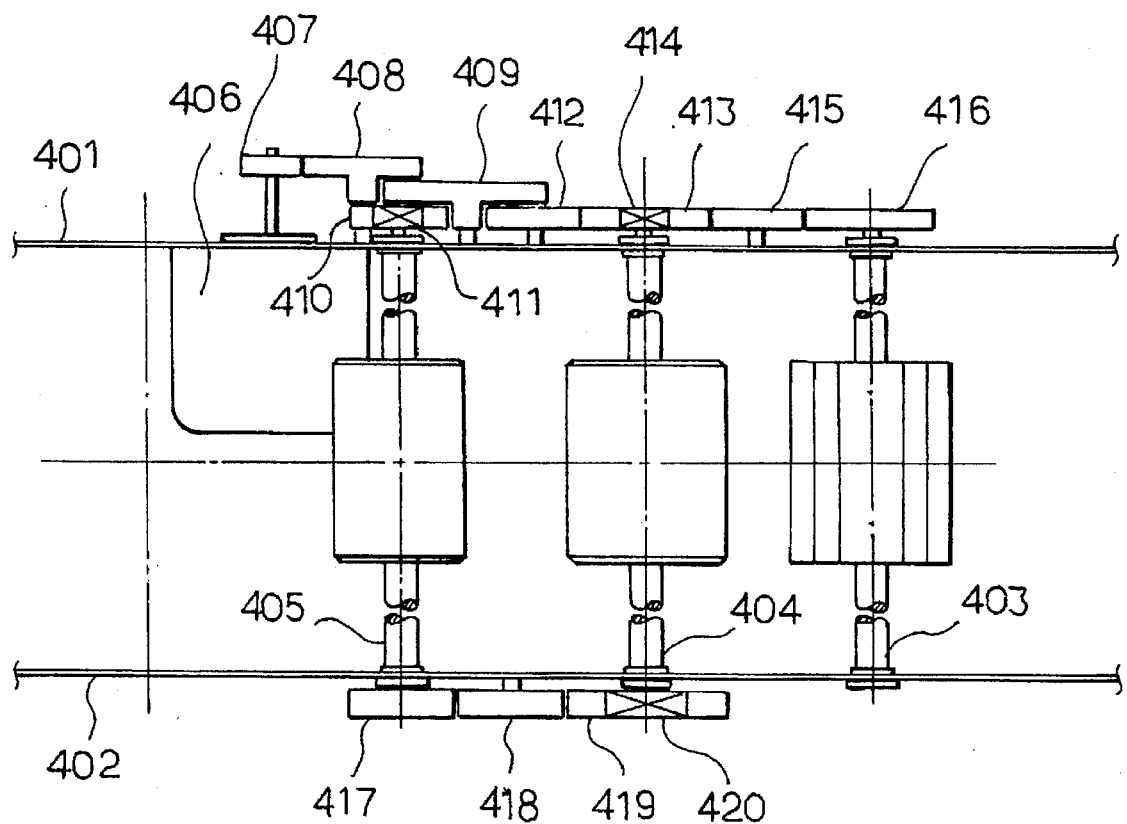
FIG. 5 is a view showing a jam preventing drive device for a facsimile in accordance with a fourth embodiment of the present invention.

Referring next to FIG. 5, there is shown a jam preventing drive device in accordance with a fourth embodiment of the present invention.

In the fourth embodiment, a drive motor 406 is interiorly mounted to the first frame 401. In order to transmit the rotating force of the motor 406 to the rollers, a plurality of main transmission gears 407, 408, 409, 410, 412, 413, 415 and 416 and a pair of one way clutches 411 and 414 are exteriorly provided on the first frame 401. Inside of the second frame 402, the drive device includes an auxiliary gear transmission system. That is, the document separation roller 404 and the register roller 405 have mounted thereon gears 419 and 417 respectively, which gears 419 and 417 are connected to each other through a middle gear 418. A third one way clutch 420 is set in the idle gear 419 of the document separation roller 404. The rotating force of the register roller 405 can be thus transmitted to the document separation roller 404.

The rotating force transmission process of the drive device of the fourth embodiment is different from that of the second embodiment of FIG. 3. That is, the forward rotating force of the motor 406 is transmitted to the document separation roller 404 through the gears 408, 409, 412 and 413 and the second one clutch 414 so as to rotate the roller 404, and in turn transmitted to the guide roller 403 through the gears 415 and 416 so as to rotate the roller 403.

After the front end of the facsimile document has passed by the register roller 405 and neatly arranged, the rotating direction of the drive motor 406 is reversed. The rotating force of the motor 406 is transmitted to the register roller 405 through the gears 408 and 410 and the first one way clutch 411, thus to rotate the roller 405. The rotating force of the register roller 405 in turn is transmitted to the document separation roller 404 through the gears 417, 418 and 419 and the third one way clutch 420, thus to rotate the roller 404. Therefore, the document whose front end has been neatly arranged after passing the center line of the register roller 405 is continuously fed by the rotation of both the document separation roller 404 and the register roller 405.

Figure 6:
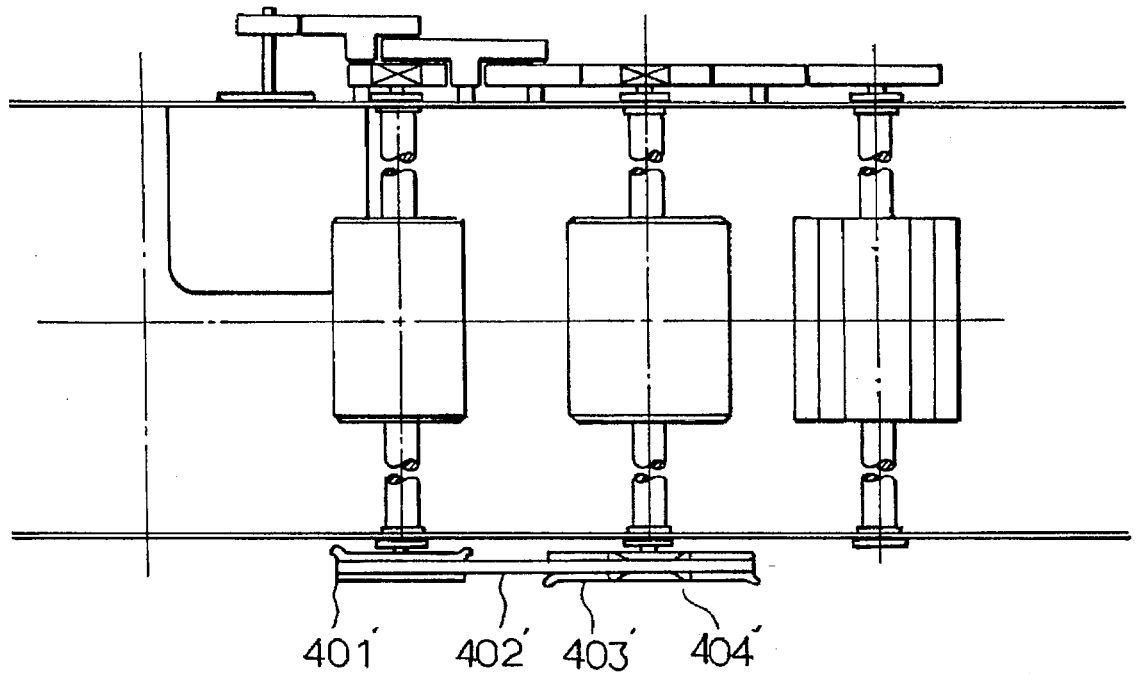
FIG. 6 is a view showing a jam preventing drive device for a facsimile in accordance with a fifth embodiment of the present invention.

FIG. 6 is a view showing a jam preventing drive device in accordance with a fifth embodiment of the present invention.

In the fifth embodiment, the general shape of the drive device remains the same as in the fourth embodiment, but the auxiliary gear transmission system for transmitting the rotating force of the register roller to the document separation roller during the reverse rotation of the motor is substituted with a belt transmission system.

That is, a belt pulley 401' is mounted to the rotating shaft of the register roller, while a belt pulley 403' having a one way clutch 404' is mounted to the rotating shaft of the document separation roller. The two pulleys 401' and 404' are connected to each other by a timing belt 402'. The drive device of the fifth embodiment yields the same result as described for the fourth embodiment without affecting the functioning of the invention.

As described above, a jam preventing drive device for a facsimile of the invention removes instability of document relay during document feeding operation, thus to improve operational reliability of the facsimile, and particularly prevents possible twisting of a document as well as possible misfeeding of a document, thus to prevent document jam.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the present invention may be adapted to a drive device of a copying machine.

What is claimed is:

1. A drive device for paper feeder in a facsimiles, comprising:
    a drive motor for generating a rotating force;
    main transmission gears for rotating both a document separation roller and a guide roller by transmitting the rotating force of the motor to said rollers during initial rotation of the motor, and for rotating a register roller by transmitting the rotating force of the motor to said register roller during reverse rotation of the motor;
    said register roller, said document separation roller and said guide roller rotatably connected to said main transmission gears; and
    first auxiliary transmission means for transmitting the rotating force of said register roller to said document separation roller during the reverse rotation of the motor,
    wherein the rotating force of the motor is transmitted to the document separation roller and the guide roller during the initial rotation of the motor without being transmitted to the register roller, while the rotating force of the motor is transmitted to the register roller and the document separation roller during the reverse rotation of the motor.

2. The drive device according to claim 1, wherein said first auxiliary transmission means comprises:
    a first pulley mounted to a rotating shaft of said register roller;
    a second pulley mounted to a rotating shaft of said document separation roller, said second pulley being provided with a first one way clutch; and
    a first timing belt interfacing with said first and second pulleys and connecting the pulleys to each other.

3. The drive device according to claim 2, wherein the diameter of said first pulley of the register roller is larger than the diameter of said second pulley of the document separation roller, so that surface linear velocity of the register roller is higher than that of said document separation roller.

4. The drive device according to claim 2, wherein said main transmission gears comprise:
    a step gear rotatably interlocking with an output gear of the motor;
    a second idle gear coupled to said step gear, said second idle gear having a third one way clutch for selectively transmitting the rotating force of the motor to said register roller;
    a third idle gear having a fourth one way clutch for selectively transmitting the rotating force of the motor to said document separation roller;
    a second middle gear rotatably interlocking with said step gear and said third idle gear; and
    a third middle gear rotatably interlocking with said third idle gear and a gear of said guide roller.

5. The drive device according to claim 4, wherein said fourth one way clutch transmits the rotating force of the motor to said document separation roller during the initial rotation of the motor, while said third one way clutch transmits the rotating force of the motor to said register roller during the reverse rotation of the motor.

6. The drive device according to claim 2, wherein
    said main transmission gears comprise:
    a step gear rotatably interlocking with an output gear of the motor;
    a second idle gear coupled to said step gear, said second idle gear having a third one way clutch for selectively transmitting the rotating force of the motor to said document separation roller;
    a third idle gear having a fourth one way clutch for selectively transmitting the rotating force of the motor to said register roller;
    a second middle gear rotatably interlocking with said step gear and said third idle gear; and a third middle gear rotatably interlocking with said third idle gear and a gear of an out feeding roller; and said drive device further comprising second auxiliary transmission means for transmitting the rotating force of said document separation roller to said guide roller during the initial rotation of said motor.

7. The drive device according to claim 6, wherein said second auxiliary transmission means comprises:
   a third pulley mounted to the rotating shaft of said document separation roller and having a fifth one way clutch;
   a fourth pulley mounted to the rotating shaft of said guide roller; and
   a second timing belt interfacing with said third and fourth pulleys and connecting the pulleys to each other.

8. The drive device according to claim 6, wherein said second auxiliary transmission means comprises:
   a fourth idle gear mounted to the rotating shaft of said document separation roller and having a sixth one way clutch;
   a second gear mounted to the rotating shaft of said guide roller; and
   a fourth middle gear rotatably interlocking with said fourth idle gear and said second gear.

9. The drive device according to claim 1, wherein said first auxiliary transmission means comprises:
   a first gear mounted to a rotating shaft of said register roller;
   a first idle gear mounted to a rotating shaft of said document separation roller, said idle gear being provided with a second one way clutch; and
   a first middle gear rotatably interlocking with said first gear and said first idle gear.

10. The drive device according to claim 9, wherein the diameter of said first gear of the register roller is larger than the diameter of said first idle gear of the document separation roller, so that surface linear velocity of the register roller is higher than that of said document separation roller.

11. The drive device according to claim 9, wherein said main transmission gears comprise:
   a step gear rotatably interlocking with an output gear of the motor;
   a second idle gear coupled to said step gear, said second idle gear having a third one way clutch for selectively transmitting the rotating force of the motor to said register roller;
   a third idle gear having a fourth one way clutch for selectively transmitting the rotating force of the motor to said document separation roller;
   a second middle gear rotatably interlocking with said step gear and said third idle gear; and
   a third middle gear rotatably interlocking with said third idle gear and a gear of said guide roller.

12. The drive device according to claim 11, wherein said fourth one way clutch transmits the rotating force of the motor to said document separation roller during the initial rotation of the motor, while said third one way clutch transmits the rotating force of the motor to said register roller during the reverse rotation of the motor.

13. The drive device according to claim 9, wherein said main transmission gears comprise:
   a step gear rotatably interlocking with an output gear of the motor;
   a second idle gear coupled to said step gear, said second idle gear having a third one way clutch for selectively transmitting the rotating force of the motor to said document separation roller;
   a third idle gear having a fourth one way clutch for selectively transmitting the rotating force of the motor to said register roller;
   a second middle gear rotatably interlocking with said step gear and said third idle gear; and
   a third middle gear rotatably interlocking with said third idle gear and a gear of an out feeding roller; and
   said drive device further comprising second auxiliary transmission means for transmitting the rotating force of said document separation roller to said guide roller during the initial rotation of said motor.

14. The drive device according to claim 13, wherein said second auxiliary transmission means comprises:
   a third pulley mounted to the rotating shaft of said document separation roller and having a fifth one way clutch;
   a fourth pulley mounted to the rotating shaft of said guide roller; and
   a second timing belt interfacing with said third and fourth pulleys and connecting the pulleys to each other.

15. The drive device according to claim 13, wherein said second auxiliary transmission means comprises:
   a fourth idle gear mounted to the rotating shaft of said document separation roller and having a sixth one way clutch;
   a second gear mounted to the rotating shaft of said guide roller; and
   a fourth middle gear rotatably interlocking with said fourth idle gear and said second gear.

16. The drive device according to claim 1, wherein said main transmission gears comprise:
   a step gear rotatably interlocking with an output gear of the motor;
   a second idle gear coupled to said step gear, said second idle gear having a third one way clutch for selectively transmitting the rotating force of the motor to said register roller;
   a third idle gear having a fourth one way clutch for selectively transmitting the rotating force of the motor to said document separation roller;
   a second middle gear rotatably interlocking with said step gear and said third idle gear; and
   a third middle gear rotatably interlocking with said third idle gear and a gear of said guide roller.

17. The drive device according to claim 16, wherein said fourth one way clutch transmits the rotating force of the motor to said document separation roller during the initial rotation of the motor, while said third one way clutch transmits the rotating force of the motor to said register roller during the reverse rotation of the motor.

18. The drive device according to claim 1, wherein said main transmission gears comprise:
   a step gear rotatably interlocking with an output gear of the motor;
   a second idle gear coupled to said step gear, said second idle gear having a third one way clutch for selectively transmitting the rotating force of the motor to said document separation roller;
   a third idle gear having a fourth one way clutch for selectively transmitting the rotating force of the motor to said register roller;
   a second middle gear rotatably interlocking with said step gear and said third idle gear; and a third middle gear rotatably interlocking with said third idle gear and a gear of an out feeding roller; and said drive device further comprising second auxiliary transmission means for transmitting the rotating force of said document separation roller to said guide roller during the initial rotation of said motor.

19. The drive device according to claim 18, wherein said second auxiliary transmission means comprises:

a third pulley mounted to the rotating shaft of said document separation roller and having a fifth one way clutch;

a fourth pulley mounted to the rotating shaft of said guide roller; and a second timing belt interfacing with said third and fourth pulleys and connecting the pulleys to each other.

20. The drive device according to claim 18, wherein said second auxiliary transmission means comprises:

a fourth idle gear mounted to the rotating shaft of said document separation roller and having a sixth one way clutch;

a second gear mounted to the rotating shaft of said guide roller; and a fourth middle gear rotatably interlocking with said fourth idle gear and said second gear.

* * * * *

UNITED STATES PATENT AND TRADEMARK OFFICE
CERTIFICATE OF CORRECTION

PATENT NO. : 5,671,071
DATED : September 23, 1997
INVENTOR(S) : Hey-Song Ahn

It is certified that error appears in the above-identified patent and that said Letters Patent is hereby corrected as shown below:

In claim 1, at col. 7, line 61, change "facsimiles" to --facsimile--.

Signed and Sealed this

Sixteenth Day of December, 1997

Attest:

BRUCE LEHMAN

Attesting Officer

Commissioner of Patents and Trademarks